United States Patent
Dubois

[11] 4,046,708
[45] Sept. 6, 1977

[54] MIXTURE OF NEMATIC LIQUID CRYSTALS EXHIBITING A POSITIVE DIELECTRIC ANISOTROPY AND A WIDE TEMPERATURE RANGE

[75] Inventor: Jean-Claude Dubois, Paris, France

[73] Assignee: Thomson-CSF, Paris, France

[21] Appl. No.: 526,930

[22] Filed: Nov. 25, 1974

[30] Foreign Application Priority Data

Nov. 28, 1973  France .................. 73.42293

[51] Int. Cl.$^2$ .................. C09K 3/34; G02F 1/13
[52] U.S. Cl. .................. 252/299; 252/408; 350/160 LC
[58] Field of Search .................. 252/299, 408; 350/160 LC

[56] References Cited

U.S. PATENT DOCUMENTS

| | | | |
|---|---|---|---|
| 3,881,806 | 5/1975 | Suzuki | 252/299 |
| 3,891,307 | 6/1975 | Tsukamoto et al. | 350/160 LC |
| 3,947,375 | 3/1976 | Gray et al. | 252/299 |
| 3,952,046 | 4/1976 | Scherrer et al. | 252/299 |
| 3,954,653 | 5/1976 | Yamazaki | 252/299 |
| 3,963,311 | 6/1976 | Boller et al. | 350/160 LC |

FOREIGN PATENT DOCUMENTS

| | | | |
|---|---|---|---|
| 807,165 | 11/1973 | Belgium | 252/299 |
| 2,024,269 | 12/1971 | Germany | 252/299 |
| 2,321,632 | 11/1974 | Germany | 252/299 |
| 2,306,739 | 8/1974 | Germany | 252/299 |
| 2,502,904 | 7/1975 | Germany | 252/299 |
| 5,023,385 | 3/1975 | Japan | 252/299 |

OTHER PUBLICATIONS

Gray, G. W., et al. Electronics Letters, vol. 9, No. 6, pp. 130–131 (Mar.1973).
Creagh, L. T., Proc. of the IEEE, vol. 61, No. 7, pp. 814–821 (July 1973).

*Primary Examiner*—Benjamin R. Padgett
*Assistant Examiner*—T. S. Gron
*Attorney, Agent, or Firm*—Cushman, Darby & Cushman

[57] ABSTRACT

A nematic liquid crystal for display devices, capable of presenting a helical structure in a wide temperature range down to $-10°$ C, is provided. This is a mixture of substances taken from two groups of the formulae:

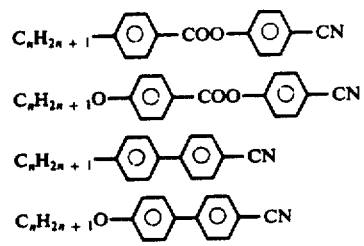

wherein $n$ is an integer from 1 to 12.

2 Claims, No Drawings

MIXTURE OF NEMATIC LIQUID CRYSTALS EXHIBITING A POSITIVE DIELECTRIC ANISOTROPY AND A WIDE TEMPERATURE RANGE

The present invention relates to nematic liquid crystals exhibiting marked positive dielectric anisotropy and a wide temperature range. These liquid crystals can in particular be employed in devices where the mesomorphous phase has artificially been given a helical structure. In this case, the axes of the molecules (which are of substantial elongation in liquid crystals) remain perpendicular to a common direction but, to an observer looking in this direction, appear to be regularly offset in a given direction. This structure confers upon the liquid crystal a rotating power which is readily observable in polarised light. If an electric field orientated in accordance with the perpendicular common to the axes of the molecules, is applied to the device, said molecules have a tendency to align themselves parallel with the electric field, which tendency is the more marked the more said molecules exhibit positive dielectric anisotropy. This change in state on the part of the molecules begins to take place from the value known as the "threshold" of the field or voltage applied between the electrodes of the device; in practice, it occurs at the value known as the "saturation" value, of these same quantities and, at that instant, all rotating power disappears.

This latter property is utilised in display devices. To be capable of utilization under advantageous conditions, liquid crystals must satisfy three main conditions:

they should exhibit the mesomorphous state within quite a wide temperature range, preferably including ambient temperatures;

they should be sensitive to low-strength electric fields, so that to supply the devices only relatively low voltages are needed;

they should be stable over a period of time, despite temperature variations.

According to the present invention, there is provided a mixture of nematic liquid crystals consisting of at least two substances chosen respectively from two groups A and B said group A comprising substances satisfying the formulae:

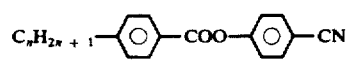
(substance $A_1$)

and

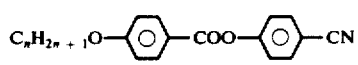
(substance $A_2$)

wherein $n$ is an integer from 1 to 12
and said group B comprising substances satisfying the formulae:

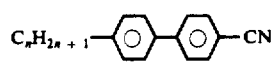
(substance $B_1$)

and

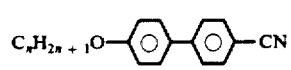
(substance $B_2$)

wherein $n$ is an integer from 1 to 12.

The principle of the invention is based upon the following observations

When a substance of group A is mixed with a substance of group B, the melting point of the mixture is reduced and the development of a eutectic structure is observed. The lowest temperature is achieved in respect of a proportion of said two substances, which is for instance defined by 2 moles of substance A to 1 mole of substance B. The temperature range (mesormorphous range or nematic range) between the melting and clarification points of the liquid crystal, is the wider the nearer the eutectic proportions in the mixture are approached.

This principle is illustrated by the following examples

1ST EXAMPLE $n = 7$ for the substance $A_1$ (paranitrile phenol paraheptyl benzoate or 4' - nitrile phenol - 4 heptyl benzoate)

$n = 5$ for the substance $B_1$ (parapentyl - paranitrilebiphenyl or 4' - nitrile - biphenyl - 4 -pentyl).
Nematic ranges:

| | |
|---|---|
| $A_1$ only | 43 to 57° C |
| $B_1$ only | 22.5 to 35° C |
| Molar mixture 2:1: | −10° C to + 50° C |

2ND EXAMPLE $n = 8$ for $A_2$(4' - nitrile phenol - 4 - octyloxybenzoate)
$n = 5$ for $B_1$ (4' - nitrile biphenyl - 4 -pentyl)

| | |
|---|---|
| $A_2$ only: | 73 to 79° C |
| $B_1$ only: | 22.5 to 35° C |
| For the molar mixture 2:1: | 0° C to 70° C |

3RD EXAMPLE

| | |
|---|---|
| $n = 4$ for $A_1$ | (paranitrile phenol parabutylbenzoate) |
| $n = 8$ for $A_2$ <br> $n = 5$ for $B_1$ | substance of the 2nd example |

Nematic range of the molar mixture 1 : 1 : 1
10° C to + 70° C

It will be remembered that devices having a helically structured nematic crystal, can be produced for example in the following fashion Two plates of glass covered with a transparent tin oxide conductive film (produced by etching a film of Sn $O_2$ in accordance with a predetermined pattern) are rubbed in the longitudinal direction. These plates are then arranged in such a fashion that the rubbing directions are perpendicular to one another. The liquid crystal is then introduced between the glass plates and automatically arranges itself in accordance with the helical structure.

Amongst the advantages of the invention, other than those already mentioned, the following should be pointed out:

the ease with which the helical structures obtained with the mixtures in accordance with the invention, can be produced and the excellence of their quality;

excellent contrast from a voltage of the order of 1 volt, between the electrodes of the device, with a maximum contrast for the saturation voltage which is of the order of 2 volts.

What I claim is:

1. A mixture of nematic liquid crystals consisting essentially of about two moles of:

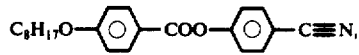

about one mole of:

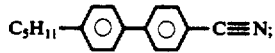

the mixture having a nematic range of about 0° C. to 70° C.

2. A mixture of nematic liquid crystals consisting essentially of equal molar quantities of:

(a)

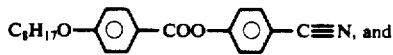

(b)

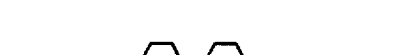

(c)

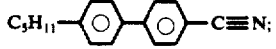

the mixture having a nematic range of about −10° C. to +70° C.

* * * * *